(12) United States Patent
Lin

(10) Patent No.: US 10,273,061 B1
(45) Date of Patent: Apr. 30, 2019

(54) CONTAINER FOR VISCOUS LIQUID

(71) Applicant: Tsai-Hui Lin, Kaohsiung (TW)

(72) Inventor: Tsai-Hui Lin, Kaohsiung (TW)

(*) Notice: Subject to any disclaimer, the term of this patent is extended or adjusted under 35 U.S.C. 154(b) by 0 days.

(21) Appl. No.: 15/835,895

(22) Filed: Dec. 8, 2017

(51) Int. Cl.
| *B65D 1/32* | (2006.01) |
| *B65D 47/06* | (2006.01) |
| *B65D 47/40* | (2006.01) |
| *B65D 83/00* | (2006.01) |
| *B65D 51/16* | (2006.01) |
| *B65D 47/32* | (2006.01) |
| *B05B 11/04* | (2006.01) |
| *F16K 15/14* | (2006.01) |
| *B65D 47/20* | (2006.01) |

(52) U.S. Cl.
CPC .......... *B65D 47/066* (2013.01); *B05B 11/047* (2013.01); *B65D 1/32* (2013.01); *B65D 47/32* (2013.01); *B65D 47/40* (2013.01); *B65D 51/1672* (2013.01); *B65D 83/0055* (2013.01); *F16K 15/148* (2013.01); *B65D 47/2031* (2013.01); *B65D 2205/00* (2013.01)

(58) Field of Classification Search
CPC .... B65D 1/32; B65D 47/066; B65D 47/2018; B65D 47/2031; B65D 51/1672; B65D 51/1683; B65D 2205/00; B65D 47/32; B05B 11/047; F16K 15/148
USPC ........................................................ 222/213
See application file for complete search history.

(56) References Cited

U.S. PATENT DOCUMENTS

| 2,224,296 | A | * | 12/1940 | Hoffman | B65D 51/1644 215/260 |
| 4,154,366 | A | * | 5/1979 | Acres | B65D 83/0055 222/212 |
| 5,626,262 | A | * | 5/1997 | Fitten | B65D 47/2031 222/184 |
| 6,530,504 | B2 | * | 3/2003 | Socier | B65D 47/2031 222/212 |
| 2006/0226171 | A1 | * | 10/2006 | Sternberg | B65D 83/0055 222/95 |
| 2010/0044397 | A1 | * | 2/2010 | Pang | B65D 1/06 222/212 |
| 2017/0348715 | A1 | * | 12/2017 | Beer | B05B 11/048 |
| 2018/0265241 | A1 | * | 9/2018 | Taruno | B65D 1/0215 |
| 2018/0273256 | A1 | * | 9/2018 | Smith | B65D 47/2018 |

FOREIGN PATENT DOCUMENTS

| DE | 10357207 | * | 6/2005 | ......... B65D 83/0055 |
| WO | WO2014032639 | * | 3/2014 | ......... B65D 47/2018 |

* cited by examiner

*Primary Examiner* — J C Jacyna
(74) *Attorney, Agent, or Firm* — Rosenberg, Klein & Lee

(57) ABSTRACT

A container for viscous liquid is revealed. A first cover set with a one-way valve and a second cover arranged with a flow control valve are disposed on two ends of a main body of the container respectively. The first cover is suspended on a supporting member. Thereby a force is applied to the main body for pouring out viscous liquid such as caramel. Thus caramel pushes against a dome of the one-way valve and a gap on the dome is opened to make the caramel out. Once no force is applied, external air flows through a gap between the flow control valve and the second cover to push a flexible piece of the flow control valve and enter the main body. Thus both the main body and the dome of the one-way valve return back to the original shape. Thereby the caramel can be handled easily.

5 Claims, 5 Drawing Sheets

CONTAINER FOR VISCOUS LIQUID

BACKGROUND OF THE INVENTION

Field of the Invention

The present invention relates to a container for viscous liquid, especially to a container for viscous liquid that controls output of the viscous liquid such as caramel easily and provides added convenience in handling the viscous liquid.

Description of Related Art

Generally, caramel is viscous syrup made by heating of various sugars including malt sugar, cane sugar, etc. The preparing process is time and labor consuming. Thus a certain amount of caramel is produced once and then is mounted into a container. The container is tilted at an angle, making the caramel flow out through the opening of the container while users intend to use the caramel. Yet the amount of caramel poured out is difficult to control and this results in inconvenience in preparation of desserts. Moreover, the caramel flows attach to and move vertically along the outer wall of the container due to a wall attachment phenomenon. Once the caramel attached to the outer wall is not cleaned completely after use, not only dirt and dust will attach to the caramel, the smells of caramel also attract small insets and flies. This causes problems in food safety and kitchen sanitation. Along with the decreased amount of the caramel, it takes longer to wait the caramel flowing from the bottom side to the opening of the container. It's getting difficult to pour out the caramel.

SUMMARY OF THE INVENTION

Therefore it is a primary object of the present invention to provide a container for viscous liquid by which viscous liquid can be handled and poured easily. Thereby the container for viscous liquid is more convenient to use.

In order to achieve the above object, a container for viscous liquid according to the present invention mainly includes a main body, a first cover, a one-way valve, a second cover, and a flow control valve. The main body is flexible and having a space therein. A connecting segment is formed on an upper end and a lower end of the main body respectively. An opening is formed on an upper end and a lower end of the main body respectively and is communicating with the space.

A connecting portion is formed on an upper end of the first cover and is used for being connected to the connecting segment on the lower end of the main body. Thus the first cover can cover and close the opening on the lower end of the main body. A through hole is disposed on a center of the first cover and is communicating with the space of the main body.

The one-way valve is arranged at the through hole of the first cover while a dome is set under a central hole thereof and used for closing the central hole. The dome is projecting toward an inner side of the central hole and is arranged with a gap.

A connecting part is disposed on a lower end of the second cover and used for being connected to the connecting segment on the upper end of the main body. Thus the second cover can cover and close the opening on the upper end of the main body. A through hole is formed on a center of the second cover and is communicating with the space of the main body.

The flow control valve is set on the through hole of the second cover and is having an assembly portion located in the through hole. A gap is formed between the assembly portion and the through hole. An upper end and a lower end of the assembly portion of the flow control valve are connected to a stopping block and a flexible piece respectively. The flexible piece and the stopping block are located on an inner side and an outer side of the second cover respectively. The flexible piece is attached to the inner wall of the second cover around the through hole and is tapered from the through hole to the part of the second cover around the through hole. A plurality of bumps is formed on a bottom side of the stopping block and the bump is in contact with and against the outer surface of the second cover. An interval is formed between the two adjacent bumps.

The connecting segment on the lower end of the main body is arranged with external threads while the connecting portion on the upper end of the first cover is disposed with internal threads to be mated with the external threads of the connecting segment on the lower end of the main body.

The connecting segment on the upper end of the main body is arranged with external threads while the connecting part on the lower end of the second cover is disposed with internal threads. Thus the connecting part of the second cover is connected to the connecting segment of the main body by the internal threads mated with the external threads.

The container for viscous liquid further includes a supporting member which is a circular rod. An upper end of the supporting member is extended upward to integrate with one side wall of the first cover. Thereby the bottom side of the first cover is supported by and suspended on the supporting member.

The gap on the dome of the one-way valve is cross-shaped.

Thereby a force is applied to the main body by a user when he/she intends to use the viscous liquid such as caramel. Thus the caramel inside the main body pushes the dome of one-way valve and the gap on the dome is deformed and opened so that the caramel is poured out. External air flows through the gap between the flow control valve and the second cover to push and move the flexible piece of the flow control valve for entering into the main body when the force applied is released. Thus the main body is turned back to the original shape. Without being pressed by the caramel, the dome of the one-way valve is also turned back and the gap of the dome is closed now. Thus the caramel is handled more easily and conveniently.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
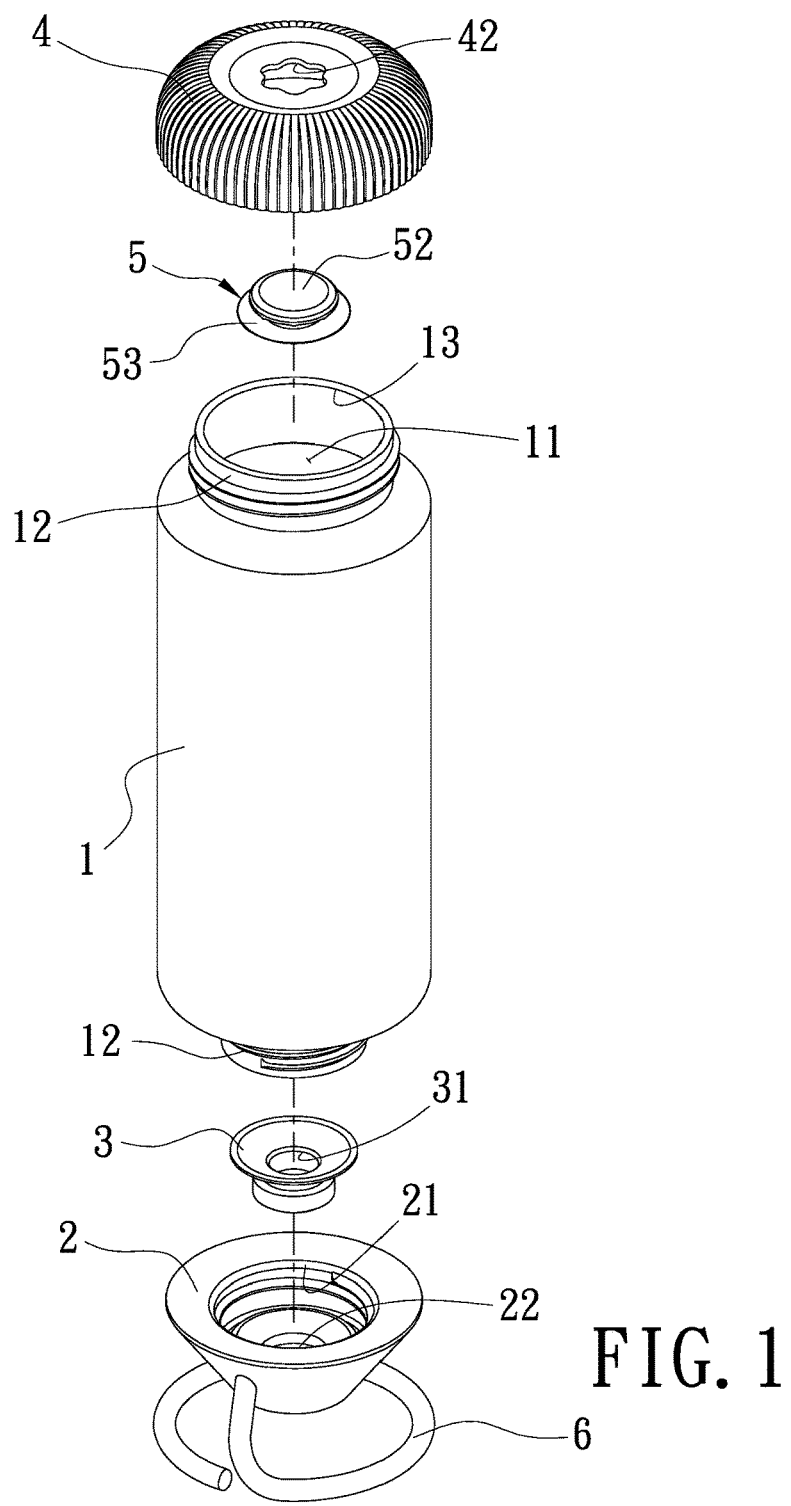
FIG. 1 is an explosive view of an embodiment according to the present invention.
Figure 2:
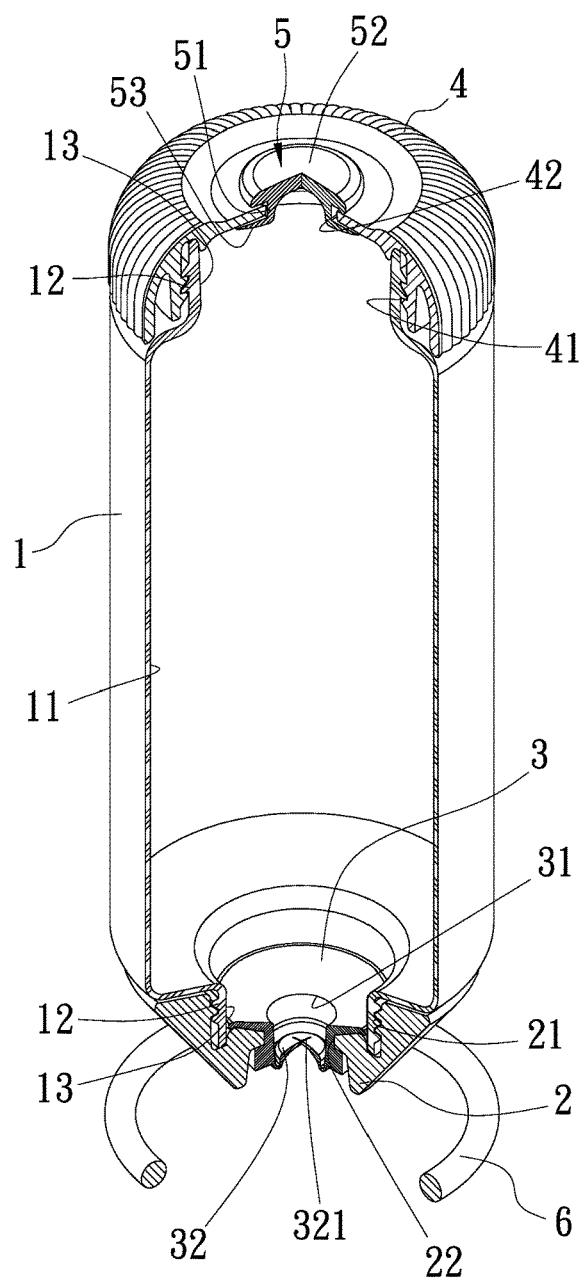
FIG. 2 is a sectional view of an embodiment according to the present invention.

Refer to FIG. 1 and FIG. 2, a container for viscous fluid according to the present invention mainly includes a main body 1, a first cover 2, a one-way valve 3, a second cover 4, a flow control valve 5 and a supporting member 6. The main body 1 is a flexible body made from plastic. A space 11 is formed inside the main body 1 and a connecting segment 12 is formed on an upper end and a lower end of the main body 1 respectively. The connecting segment 12 is arranged with external threads thereon. An opening 13 is formed on an upper end and a lower end of the main body 1 respectively and is communicating with the space 11.

A connecting portion 21 disposed with internal threads is formed on an upper end of the first cover 2. Thus the opening 13 on the lower end of the main body 1 is covered over with the first cover 2 by the internal threads of the connecting portion 21 matched with the external threads of the connecting segment 12. A through hole 22 is disposed on a center of the first cover 2 and is communicating with the space 11 of the main body 1.

The one-way valve 3 is set on the through hole 22 of the first cover 2 while a dome 32 is arranged under a central hole 31 thereof and used for closing the central hole 31. The dome 32 is projecting toward an inner side of the central hole 31 and is arranged with a cross-shaped gap 321.

The second cover 4 includes a connecting part 41 on a lower end thereof and the connecting part 41 is disposed with internal threads for being connected to the connecting segment 12 that is located on the upper end of the main body 1 and set with the external threads. Thus the second cover 4 can cover and close the opening 13 on the upper end of the main body 1. A through hole 42 is formed on a center of the second cover 4 and is communicating with the space 11 of the main body 1.

Figure 5:
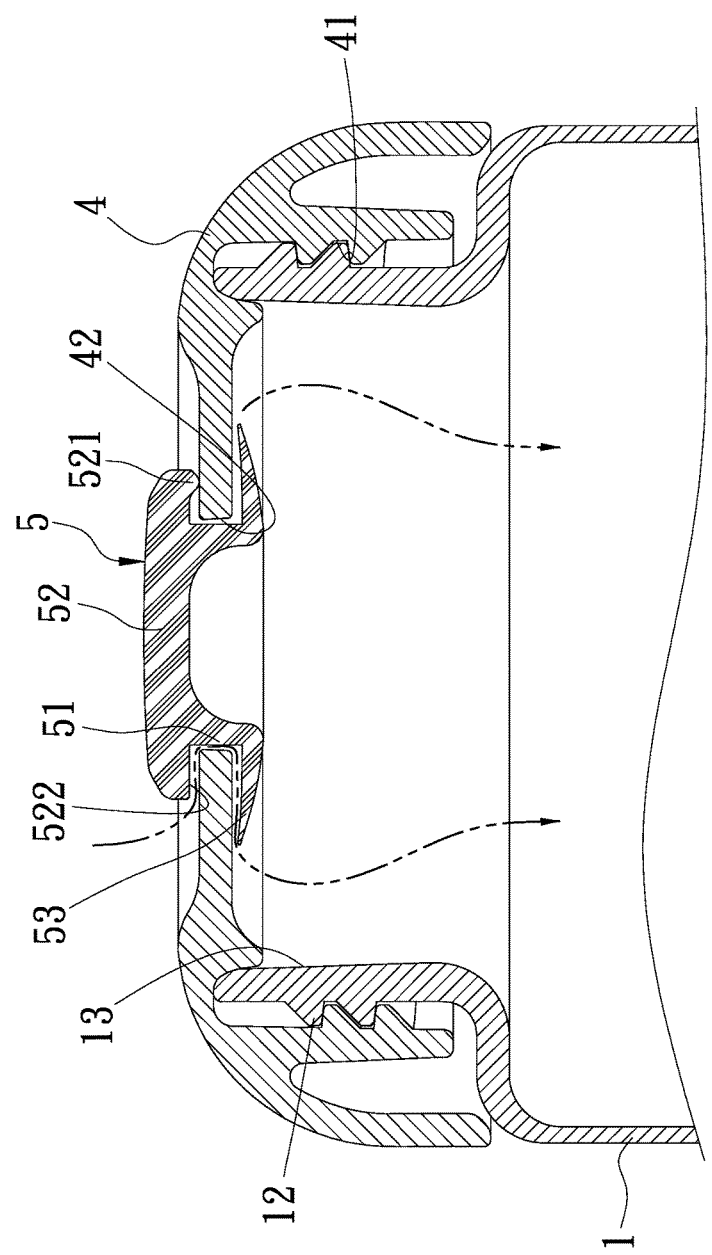
FIG. 5 is a partial enlarged view of a main body that is back to the original state in an embodiment according to the present invention.

The flow control valve 5 is arranged at the through hole 42 of the second cover 4 and is having an assembly portion 51 located in the through hole 42. A gap is formed between the assembly portion 51 and the through hole 42. An upper end and a lower end of the assembly portion 51 of the flow control valve 5 are connected to a stopping block 52 and a flexible piece 53 respectively. The flexible piece 53 and the stopping block 52 are located on an inner side and an outer side of the second cover 4 respectively. The flexible piece 53 is attached to the inner wall of the second cover 4 around the through hole 42 and the thickness thereof is tapered from the through hole 42 to the part of the second cover 4 around the through hole 42. A plurality of bumps 521 is formed on a bottom side of the stopping block 52 on the outer side of the second cover 4 and the bumps 521 are in contact with and against the outer surface of the second cover 4. An interval 522 is formed between the two adjacent bumps 521, as shown in FIG. 5.

The supporting member 6 is a circular rod and having an upper end extended upward to connect to and integrate with one side wall of the first cover 2. Thereby the bottom side of the first cover 2 is supported by and suspended on the supporting member 6.

Thereby the second cover 4 is opened for pouring liquid caramel into the space 11 of the main body 1 through the opening 13 on the upper end of the main body 1 while users intend to fill sticky liquid such as caramel into the present invention. Then the internal threads on the connecting part 41 of the second cover 4 are mated with the external threads on the connecting segment 12 of the main body 1 so that the opening 13 on the upper end of the main body 1 is closed by the second cover 4.

Figure 3:
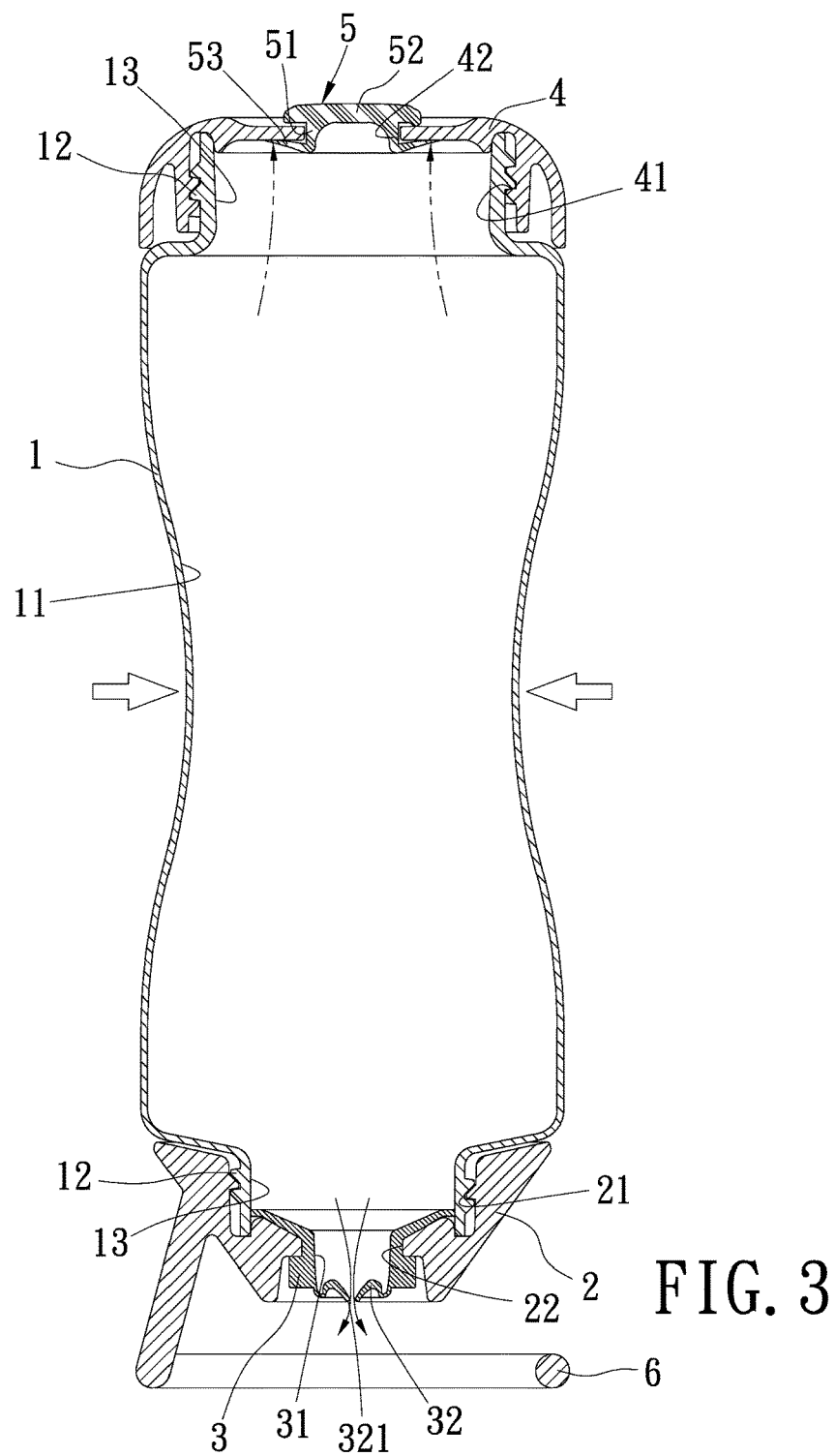
FIG. 3 is a schematic drawing showing how to get caramel out of an embodiment according to the present invention.

Refer to FIG. 3, the user applies a force to the main body 1 when he/she intends to add caramel to desserts in the baking process. Then the main body 1 is deformed and the caramel in the space 11 of the main body 1 is pressed and squeezed so as to push the dome 32 arranged at the central hole 31 of the one-way valve 3 set on the first cover 2. Thus the dome 32 that is originally projecting toward to the inner side of the central hole 31 now is deformed and projecting toward the outer side of the central hole 31. The cross-shaped gap 321 on the dome 32 is also deformed and opened so that the caramel is forced out through the cross-shaped gap 321 to be added into the desserts/food.

Figure 4:
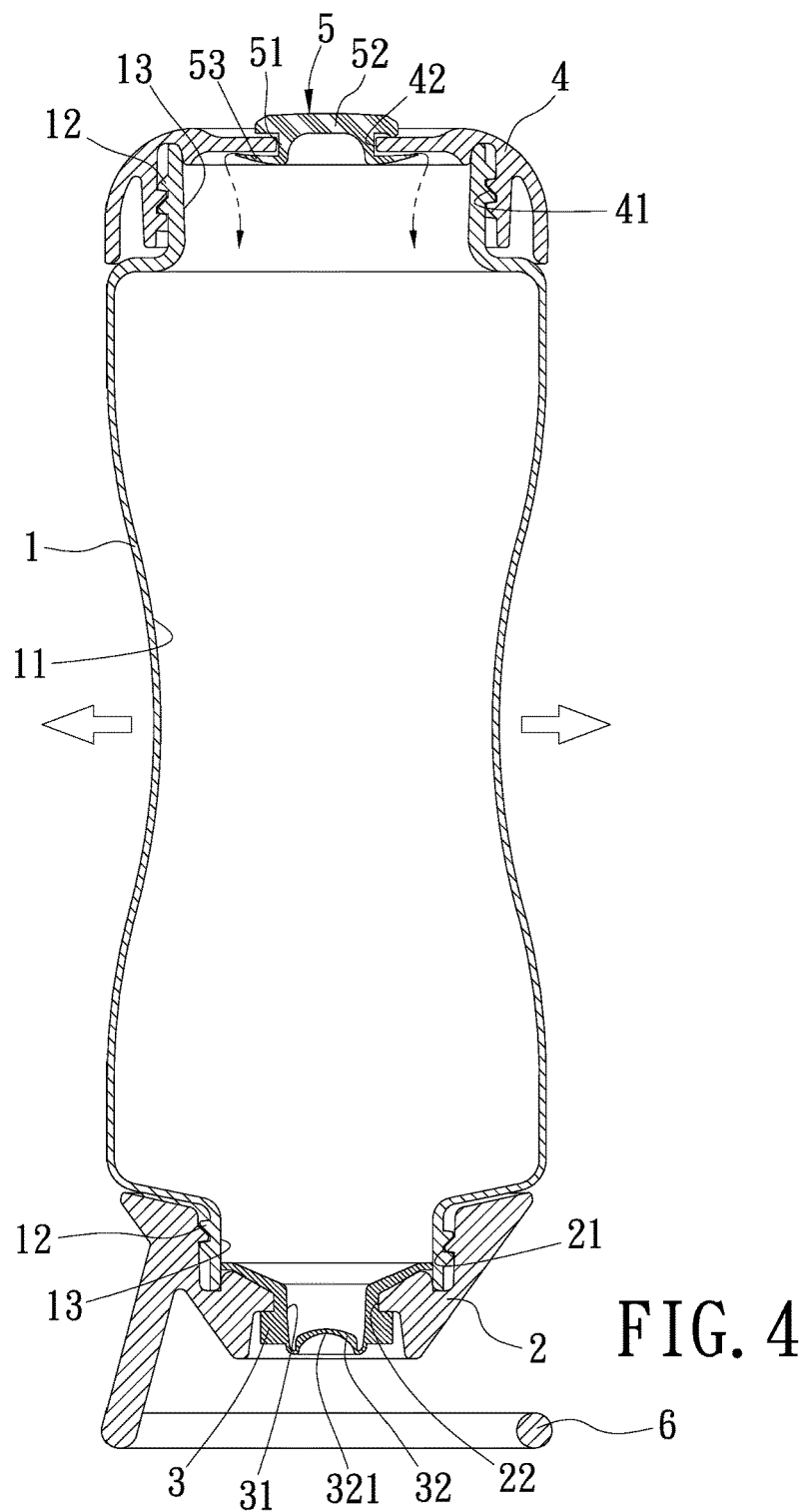
FIG. 4 is a schematic drawing showing a main body is back to the original state in an embodiment according to the present invention.

After adding a certain amount of caramel required, the user stops pressing the main body 1 and the force applied to the main body 1 is released. Refer to FIG. 4 and FIG. 5, at the moment, external air flows through the interval 522 between the two adjacent bumps 521 of the flow control valve 5 on the second cover 4 and the gap between the assembly portion 51 of the flow control valve 5 and the through hole 42 of the second cover 4 to push and move the flexible piece 53 of the flow control valve 5 for entering into the space 11 of the main body 1. Thus the main body 1 is turned back to the original state/shape. At the same time, without being pressed by the caramel, the dome 32 of the one-way valve 3 set on the first cover 2 is also turned back to be projecting toward to the inner side of the central hole 31. The cross-shaped gap 321 of the dome 32 is closed now so that no more caramel in the space 11 is going to flow out.

Thereby the amount of the caramel poured out is easy to control by the design of the present container and the caramel is more convenient to use while making desserts. The bottom side of the first cover 2 is supported by and suspended on the supporting member 6 to avoid contact between the first cover 2 and the desk surface/external objects. Thus the bottom side of the first cover 2 used for output of the caramel and the one-way valve 3 therein will not be contaminated. Moreover, the caramel is deposited close to the first cover 2 so that the caramel can be poured out quickly, without waiting for a period of time. Instead of giving the container a tilt, the caramel is passed through the one-way valve 3 set on the center of the first cover 2 by being squeezed. Thus the wall-attachment of the caramel flows on the outer surface of the container can be avoided. The attachment of dirt and dust to the caramel and the smells of caramel that attract small insets and flies can further be prevented. Therefore food safety and environmental hygiene are improved while making desserts.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A container for viscous liquid comprising:
a main body that is a flexible body and having a space therein, a connecting segment formed on an upper end and a lower end thereof respectively, an opening set on an upper end and a lower end thereof respectively and communicating with the space;

a first cover that is disposed with a connecting portion on an upper end thereof and a through hole on a center thereof; the connecting portion is connected to the connecting segment on the lower end of the main body so that the first cover is able to cover and close the opening on the lower end of the main body; the through hole is communicating with the space of the main body;

a one-way valve that is set on the through hole of the first cover and disposed with a dome set under a central hole thereof for closing the central hole; the dome is projecting toward an inner side of the central hole and is arranged with a gap;

a second cover that is disposed with a connecting part on a lower end thereof and a through hole on a center thereof; the connecting part is used for being connected to the connecting segment on the upper end of the main body so that the second cover is able to cover and close the opening on the upper end of the main body while the through hole is communicating with the space of the main body; and a flow control valve that is arranged at the through hole of the second cover and including an assembly portion thereof located in the through hole, a stopping block and a flexible piece connected to an upper end and a lower end of the assembly portion respectively; a gap is formed between the assembly portion and the through hole; the flexible piece and the stopping block are located on an inner side and an outer side of the second cover respectively; the flexible piece is attached to an inner wall of the second cover around the through hole thereof and is tapered from the through hole to a part of the second cover around the through hole; a plurality of bumps is formed on a bottom side of the stopping block on the outer side of the second cover and the bumps are in contact with and against an outer surface of the second cover; an interval is formed between the two adjacent bumps.

2. The device as claimed in claim 1, wherein the connecting segment on the lower end of the main body is arranged with external threads while the connecting portion on the upper end of the first cover is disposed with internal threads to be mated with the external threads of the connecting segment on the lower end of the main body.

3. The device as claimed in claim 1, wherein the connecting segment on the upper end of the main body is arranged with external threads while the connecting part on the lower end of the second cover is disposed with internal threads to be mated with the external threads of the connecting segment on the upper end of the main body.

4. The device as claimed in claim 1, wherein the container for viscous liquid further includes a supporting member which is a circular rod and having an upper end thereof extended upward to integrate with one side wall of the first cover so that a bottom side of the first cover is supported by and suspended on the supporting member.

5. The device as claimed in claim 1, wherein the gap on the dome of the one-way valve is cross-shaped.

* * * * *